United States Patent
Klassy

(10) Patent No.: US 9,156,440 B2
(45) Date of Patent: Oct. 13, 2015

(54) POWERED LANDING GEAR WITH CROSS-PORT DISABLE VALVE TRAVEL LIMITER

(71) Applicant: Paul L. Klassy, Hampton, IA (US)

(72) Inventor: Paul L. Klassy, Hampton, IA (US)

( * ) Notice: Subject to any disclaimer, the term of this patent is extended or adjusted under 35 U.S.C. 154(b) by 0 days.

(21) Appl. No.: 14/549,863

(22) Filed: Nov. 21, 2014

(65) Prior Publication Data
US 2015/0137498 A1  May 21, 2015

Related U.S. Application Data

(60) Provisional application No. 61/907,071, filed on Nov. 21, 2013.

(51) Int. Cl.
*B60S 9/02* (2006.01)
*B60D 1/66* (2006.01)
*B60S 9/08* (2006.01)

(52) U.S. Cl.
CPC ... *B60S 9/02* (2013.01); *B60D 1/66* (2013.01); *B60S 9/08* (2013.01)

(58) Field of Classification Search
CPC .............. B60S 9/02; B60D 1/66; B60P 1/56; B60P 3/34
See application file for complete search history.

(56) References Cited

U.S. PATENT DOCUMENTS

| | | | | |
|---|---|---|---|---|
| 5,199,738 A * | 4/1993 | VanDenberg | .............. | 280/766.1 |
| 5,509,687 A * | 4/1996 | Thorndike | ................. | 280/766.1 |
| 6,099,016 A * | 8/2000 | Peveler | .......................... | 280/475 |
| 6,131,391 A * | 10/2000 | Poorman | ......................... | 60/448 |
| 6,598,886 B2 * | 7/2003 | Baird et al. | ................. | 280/6.155 |
| 6,623,035 B1 * | 9/2003 | Schneider | ................... | 280/766.1 |
| 6,893,006 B2 * | 5/2005 | Drake, III | ..................... | 254/425 |
| 6,896,289 B2 * | 5/2005 | Gross | .......................... | 280/766.1 |
| 6,926,305 B2 * | 8/2005 | Daniel | ......................... | 280/766.1 |
| 7,055,859 B2 * | 6/2006 | Peveler | ...................... | 280/766.1 |
| 7,163,207 B2 * | 1/2007 | Baird et al. | ................. | 280/6.153 |
| 7,240,921 B2 * | 7/2007 | Baxter | ....................... | 280/763.1 |
| 7,258,363 B2 * | 8/2007 | Baxter | ....................... | 280/763.1 |
| 7,290,799 B2 * | 11/2007 | Santos | ......................... | 280/766.1 |
| 7,296,779 B2 * | 11/2007 | Bakshi et al. | ................. | 248/677 |
| 7,311,331 B2 * | 12/2007 | McGlothlin | ............... | 280/765.1 |
| 7,325,786 B2 * | 2/2008 | Drake, III | ..................... | 254/419 |
| 7,429,061 B2 * | 9/2008 | Perkins | ....................... | 280/766.1 |
| 8,051,545 B2 * | 11/2011 | Peveler | .......................... | 29/428 |
| 8,136,840 B2 * | 3/2012 | Riedl | ......................... | 280/766.1 |
| 8,622,425 B2 * | 1/2014 | Riedl | ......................... | 280/763.1 |
| 8,622,426 B2 * | 1/2014 | Riedl | ......................... | 280/763.1 |
| 8,678,471 B2 * | 3/2014 | McCarthy et al. | ............ | 296/156 |
| 8,827,309 B1 * | 9/2014 | Ouellet | ...................... | 280/763.1 |
| 2006/0119089 A1 * | 6/2006 | Rivers et al. | ............... | 280/763.1 |

OTHER PUBLICATIONS

CEQUENT Performance Products, Inc.; Powered Drive for Bulldog Jacks; Installation Instructions, F3375 (Rev-A-16437) 12/11.

* cited by examiner

*Primary Examiner* — Brodie Follman
(74) *Attorney, Agent, or Firm* — Schroeder & Siegfried, P.A.

(57) ABSTRACT

A travel limiter for landing gear extension legs which employs a pair of mechanically-operable cross-port valves fluidly coupled to the hydraulic circuit and connected between the telescoping upper and lower leg assemblies to mechanically sense when each travel stop limit is reached. The valves are mounted in the upper leg assembly and are operated by mechanical connection to the movable lower leg assembly. When actuated, each valve cross-ports the system's fluid flow from the valve's inlet port to the system's return line, thereby permitting all fluid flow and power to bypass the power drive motor.

20 Claims, 9 Drawing Sheets

POWERED LANDING GEAR WITH CROSS-PORT DISABLE VALVE TRAVEL LIMITER

CROSS REFERENCE TO RELATED APPLICATIONS

This application is an application for patent which is also disclosed in Provisional Application Ser. No. 61/907,071, filed on Nov. 21, 2013 by the same inventor, namely Paul L. Klassy, and entitled "Powered Landing Gear With Cross-port Disable Valve Travel Limiter," the benefit of the filing date of which is hereby claimed.

BACKGROUND OF THE INVENTION

The present invention relates generally to the field of power-driven landing gear equipment for semi-trailers, outriggers, crane stabilizers and the like, and more particularly to a means for effectively limiting the extension and retraction of the powered landing gear legs so as to prevent mechanical failure of the acme jack screw and other leg components due to power overload and over-torque.

At full extension, the acme screw travel in most current landing gear systems is stopped by a welded nut, pin or other mechanical stop to prevent the screw from being driven completely out of the nut. If one continues to fully extend the landing gear the stop nut or pin can fail. This in particularly true of 2-speed heavy lifting landing gear (~50,000 lb. lift capacity as commonly used on most on-highway trailers) which has a high gear ratio and delivers as much as 14,000 inch pounds of torque to the acme drive screw.

Overextending the landing gear does not just put the acme screw mechanism at risk of failure, but it can also cause severe failure of the leg due to buckling from over-extension. The upper and lower telescoping leg assemblies of the landing gear are designed with a specified overlap at maximum extension. Overextending the leg effectively reduces this "safety" overlap, which can cause catastrophic failure due to leg buckling. In this type of failure, buckling of the landing gear can actually result in the entire trailer collapsing to the ground.

Similarly, at full retraction the acme screw drive nut located at the top of the lower leg assembly will bottom out against the stop plate of the upper leg assembly. If the acme drive screw is driven beyond its fully retracted position, the drive nut can strip, the acme drive screw can strip, or both can fail together resulting in an inoperable landing gear. In the worst case, this can result in the leg collapsing as well (with stripped threads the upper leg assembly is no longer supported by the threads and can collapse along the length of the acme screw). However, a more common failure is for the nut and screw to weld together under friction resulting in a leg that is inoperable (cannot be retracted or extended). This can also be the case at full extension, where the stop locking weld, washer or pin causes the threads to begin to strip and weld the screw and nut together, thereby resulting in the landing gear being inoperable.

The above-described failure modes are typically not as common in manual landing gear systems because of human operator fatigue. That is, the physical effort to continue cranking in the low speed mode beyond what is needed to lift the trailer for hooking or unhooking prevents operators from trying to fully extend the landing gear. In addition, most landing gear have markings painted on the lower leg indicating "Stop", "Alto" or "Halt" so as to warn the operator not to overextend the legs. It is believed, however, that with the increased use of hydraulic powered drive systems, these failure modes will become more common and more severe. Since safety is a primary objective of advancing the art (prevent injuries from manual cranking) preventing any additional potential failures and safety concerns is of primary concern. Given that an external power source is used and human effort to manually crank the landing gear is eliminated, the risk to over-extend or drive beyond the fully retracted and extended travel stop limits is increased and must be managed.

There have been ongoing efforts to develop a solution for the problem of limiting the end of travel of powered landing gear legs so as to prevent damage to the mechanical components thereof. A number of methods have heretofore been considered and evaluated for resolving the above problem. For instance, general pressure relief valves, with and without foam/rubber cushion stops, have been considered to protect the jacking screw and other components from mechanical failure due to over-torque or over-loading conditions. However, with pressure relief valves there is always an inherent problem that relief valves are unable to react fast enough to stop any spike in pressure and do not provide a reliable means to limit torque. The added elastomer cushion does dampen this spike, but ultimately this solution fails because it cannot be successfully implemented to prevent overload at the end of each travel stop.

Other efforts to resolve the above problem have included the implementation of a pressure switch to bypass or disable the powered drive unit from the landing gear. However, this system adds further complications as electric power needs to be provided and the pressure switch needs to be connected to the power unit or a cross-port valve. Moreover, of added concern is the fact that the pressure switch reaction time is still not fast enough to avoid over-loading the landing gear at both the fully extended and fully retracted travel stop limits. Still further, there is not a reliable way to stop the landing gear at the desired extended position, as it is desired to maintain mechanical over-lap of the upper and lower leg assemblies to provide strength and prevent the legs from failure (e.g., buckling) due to over-extension.

Still further efforts to resolve the above problem have included employing limit switches to trigger a bypass function or disable the powered drive unit of the landing gear. While this system does have merit, it requires the introduction of electrical connections and additional logic for reverse direction operation, as any solution to the above problem requires disabling of the powered drive unit in only one direction, without complete disablement of the drive unit. Such a solution could be costly to implement. It is also possible that an encoder could be utilized to count the number of revolutions of the acme screw and stop turning prior to the end of the stop limit, but here again, implementation of such a system could prove to be costly and add undue complexity to the system as well as require a PLC computer to provide proper control logic to disable the unit in one direction only (one must be able to extend from the fully retracted position or drive the unit to retract from the fully extended position).

Therefore, it is evident there is a substantial and unsatisfied need in the industry for a reliable and cost-effective solution to the problem of limiting the end of travel of powered landing gear legs so as to prevent damage to the mechanical components thereof and enhance safety for the operators of such equipment. Such a system desirably should be relatively simple and cost effective in construction yet capable of automated operation to avoid operator error. Moreover, such a system must overcome the problems of travel limit overload and the limitations inherent with conventional relief valve or pressure switch systems, as well as other issues associated with the aforementioned systems above, and remain capable of disabling travel in one direction while permitting travel in the reverse direction.

BRIEF SUMMARY OF THE INVENTION

To overcome the problems known in the prior art and achieve the desired goals in a hydraulically powered landing gear system, a preferred leg travel limiting system has been developed which employs at least one mechanically-operated bypass valve to cross-port the power drive circuit prior to the extension legs reaching an end of travel limit. While the following discussion will focus primarily upon hydraulic landing gear systems used in connection with trailers and the like, it will be appreciated that the invention disclosed herein is equally applicable to hydraulic powered systems for the same or similar mechanisms of out-riggers and stabilizers for cranes, truck mounted booms, aerial work platforms and other similar equipment.

In order to mechanically disable and cross-port the hydraulically powered drive circuit for the landing gear, the travel limiting system for the extension legs preferably employs a pair of mechanically-operable cross-port disable valves operably connected between the upper and lower leg assemblies of the master extension leg. Upon reaching a travel stop limit in either direction, one of such valves is actuated, thus allowing free flow of fluid from the valve's inlet port to the system's return line and permitting virtually all fluid flow and power to bypass the power drive motor. In order to accomplish this function, each mechanically actuated cross-port valve allows free fluid flow in one direction while blocking reverse flow. In this manner, upon reaching the legs' travel stop limit in either direction, the drive motor(s) inlet flow is cross-ported directly to the system return line (tank) which disables motor operation in one direction while maintaining operation in the reverse direction. As noted, two of these valves are preferably incorporated into the system such that one is only actuated at the fully extended position of the leg and the other is only actuated in the fully retracted position. The valves are each mounted into the upper leg assembly of the master extension leg and each is actuated by means of a mechanical valve actuation shaft that is either connected directly to or through linkage to the movable lower leg assembly.

There are at least three optional embodiments known for operatively connecting the disable valves to the lower leg assembly. One embodiment uses two separate actuation shafts or pins that are connected to the lower leg assembly, and each operates one of the disable valves independently. A second embodiment connects both disable valves to a linkage that is in turn operated by a single telescopic shaft connected to the lower leg. A third embodiment employs a spooled wire or coiled metal strip that allows retraction/extension to perform the same function as the telescopic shaft. The foregoing embodiments are exemplary only and not meant to be limiting, as other configurations for operatively connecting the disable valves to the lower leg assembly are conceivable without departing from the invention herein.

It is important to note that the valve actuation linkage is designed such that each respective disable valve is actuated before the acme screw reaches its fully extended or fully retracted mechanical stop position. Upon actuation, the disable valve bypasses flow through a cross-port circuit. However, the bypass circuit has in inherent flow restriction that results in the drive motor being driven at the reduced bypass circuit pressure. The motor must be allowed to turn until the acme nut can come to rest at its fully retracted or fully extended stop position (i.e., against its mechanical stop). If there is no over-travel designed into the valve actuation linkage, the motor will continue to turn at the full force of the bypass circuit pressure and damage the disable valves and actuation linkage.

To prevent this condition, a spring or cam mechanism is built into the actuation linkage such that the force exerted on the linkage is limited to the resistance force of the spring or cam until the acme screw nut 21 comes to rest against the mechanical stop. Roughly, five millimeters (5.0 mm) or more of transitional travel is allowed by the force of the cam or spring in the linkage until the acme nut comes to rest against each respective mechanical stop. Once the mechanical stop is reached, full torque from the motor at the bypass circuit pressure level is transferred to the mechanical stop. The travel limiting system is therefore able to confine powered landing gear forces to a level within mechanical stop design limits, and reliably control travel limit forces to be within disable valve and valve actuation linkage limits.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
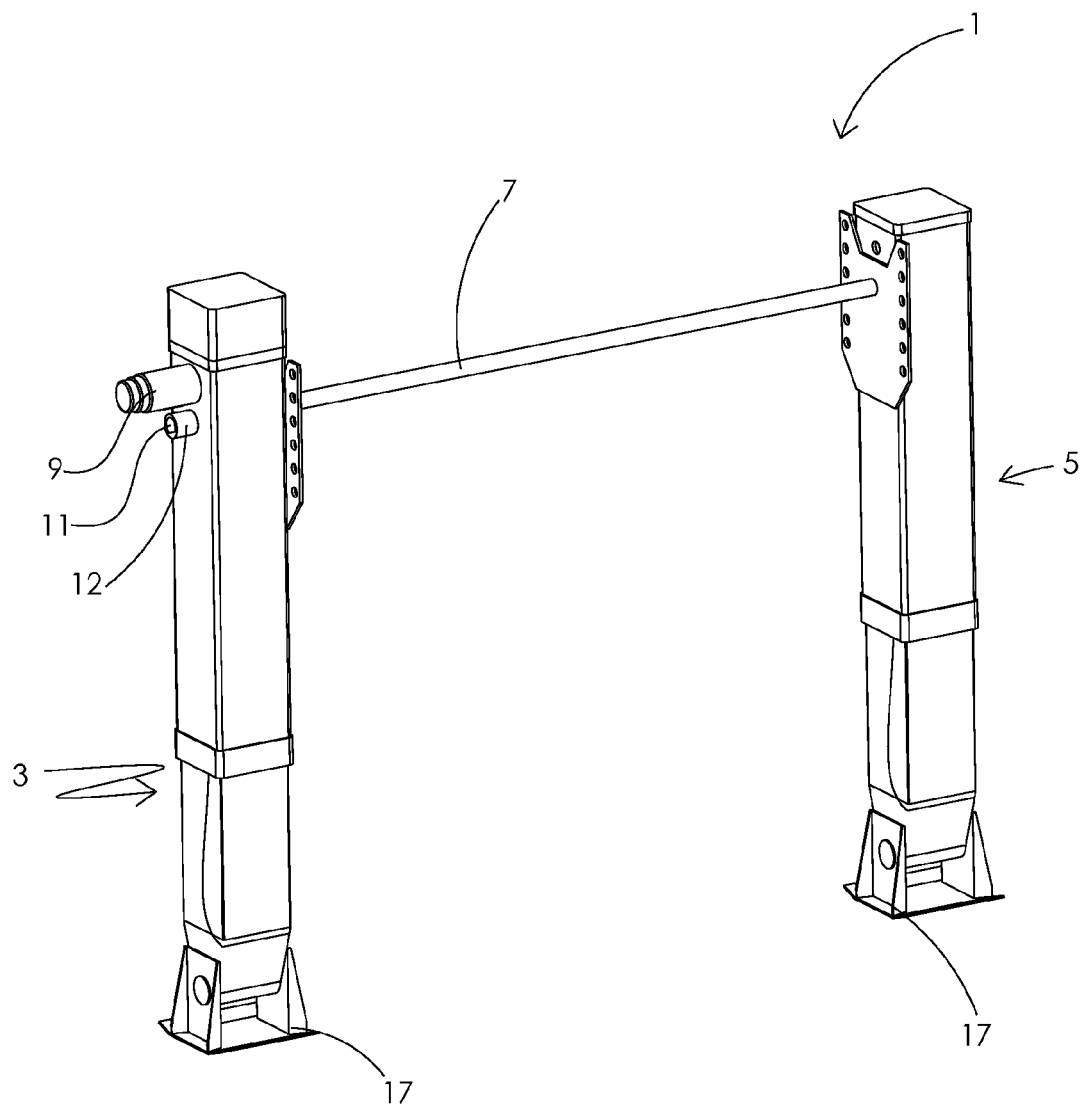
FIG. 1 is a perspective view of a typical hydraulically-powered landing gear system having extensible legs for use with semi-trailers, outriggers and the like, which incorporates the principles of my invention.

Shown in FIG. 1 is a typical landing gear assembly 1 that may be used for large semi-trailers, outriggers and the like. The general operation of such landing gear assembly 1 is fairly well known in the art. The assembly 1 includes a pair of extensible legs 3 and 5 which are interconnected via the transverse drive shaft 7 extending therebetween. The landing gear assembly shown in FIG. 1 is configured to be driven by a hydraulic motor 9, the operation of which causes the extensible legs 3 and 5 to extend and retract based on the direction of rotation of motor 9. An optional override manual crank, the construction of which will be discussed in more detail hereafter, may be fitted into shaft opening 11 in bearing block 12 to operate the landing gear assembly 1 manually instead of using the hydraulic motor 9.

Figure 2:
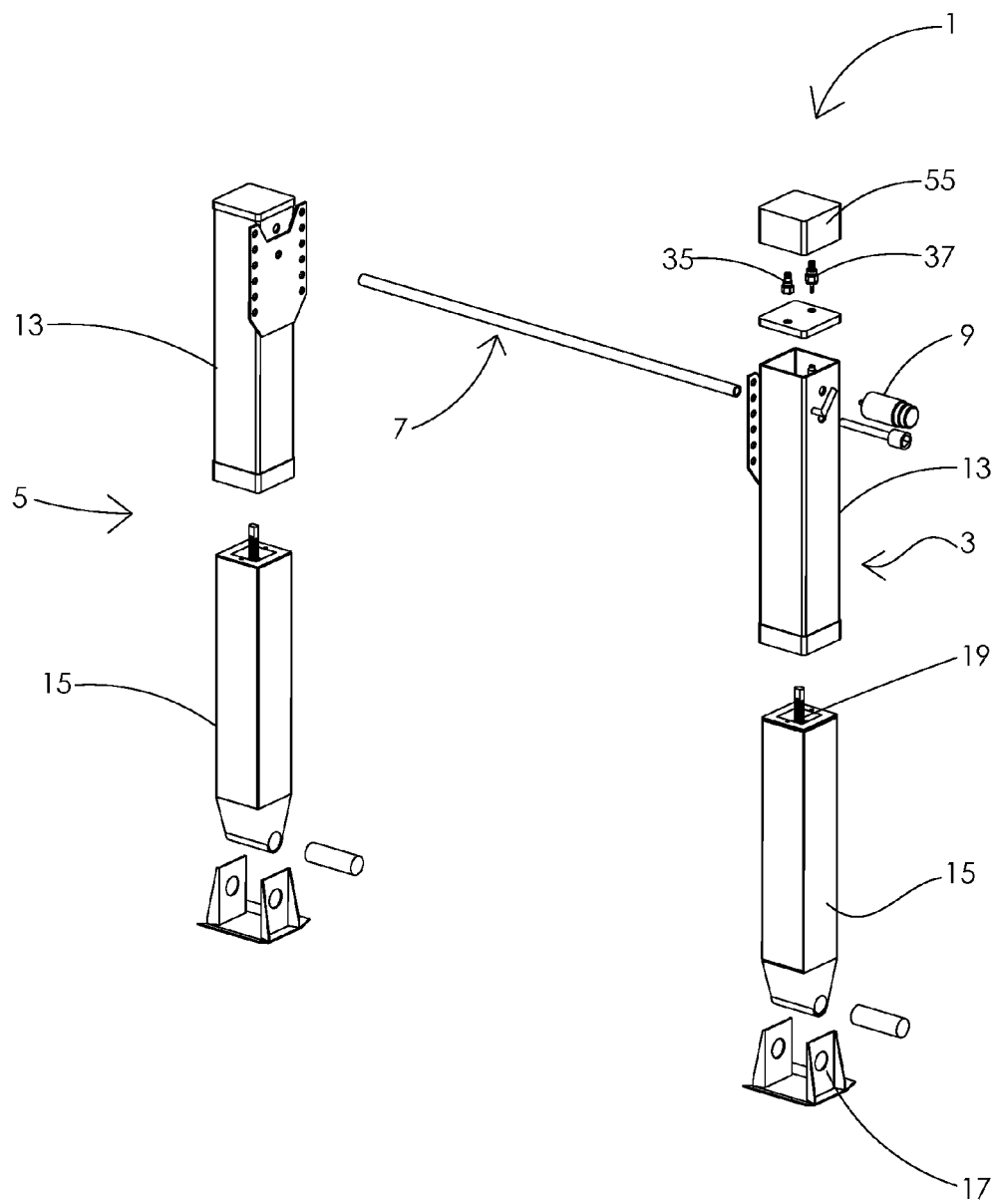
FIG. 2 is an exploded perspective view of a typical hydraulically-powered landing gear system similar to that shown in FIG. 1.
Figure 3:
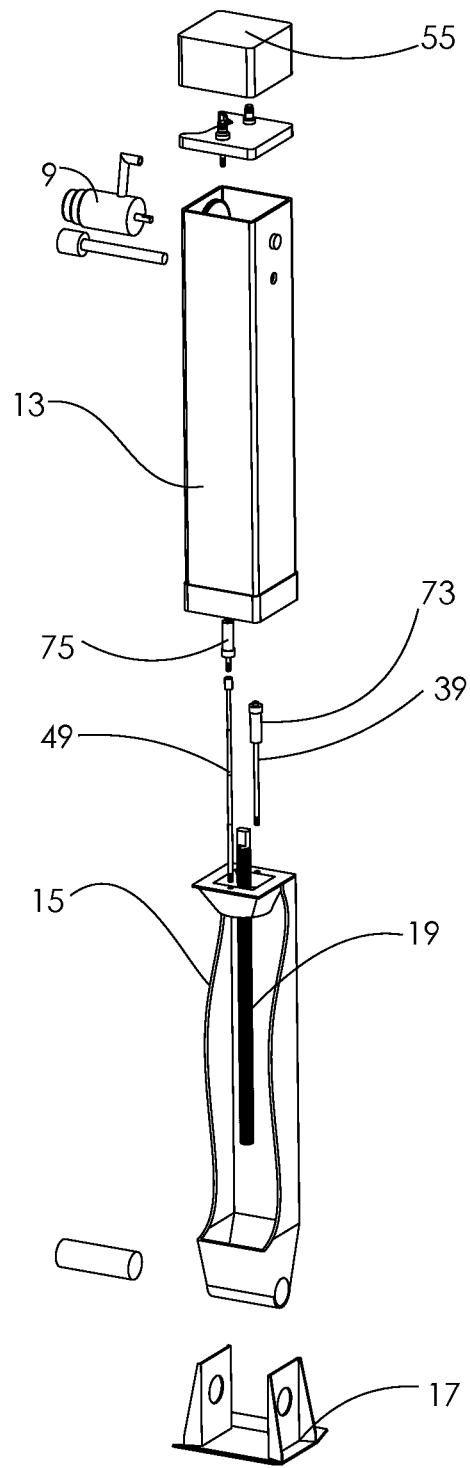
FIG. 3 is an exploded perspective view of one extensible leg of the landing gear system shown in FIG. 2 with one embodiment of the disable valve actuating shafts shown therewith.

As shown in FIGS. 2 and 3, each extensible leg 3 and 5 is composed of an upper leg assembly 13 and a lower leg assembly 15. The lower leg assembly 15 is adapted to be telescopically received in sliding relation within the upper leg assembly 13 to provide for extension and retraction of each leg. At the foot or base of each leg is a pivotally mounted shoe 17 which helps to stabilize the legs on uneven ground surfaces.

Figure 4:
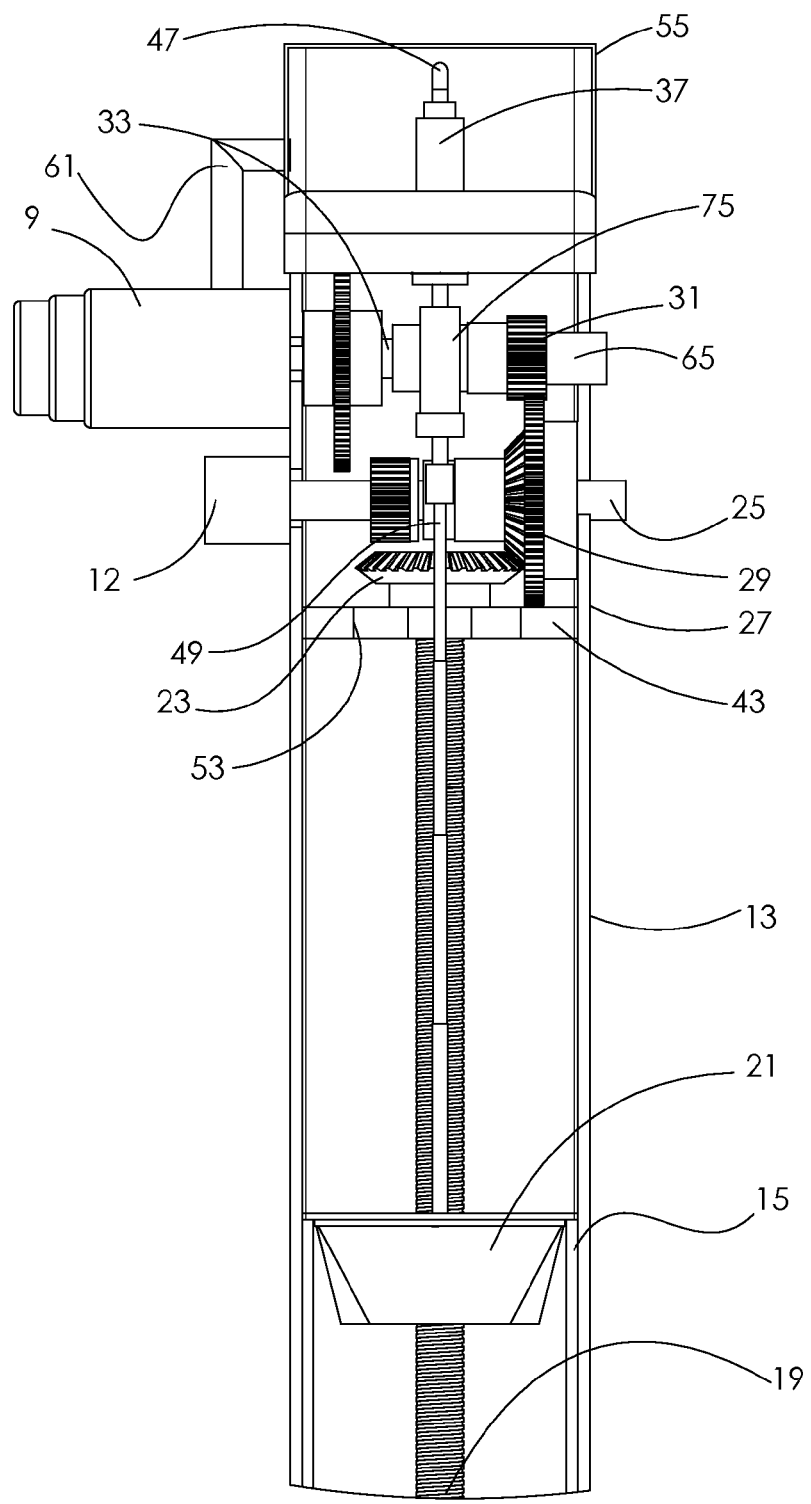
FIG. 4 is a sectioned side elavational view of an upper and lower leg assemblies for landing gear showing the powered gear train and manner of fluidly connecting cross-port disabling valves thereto.
Figure 5:
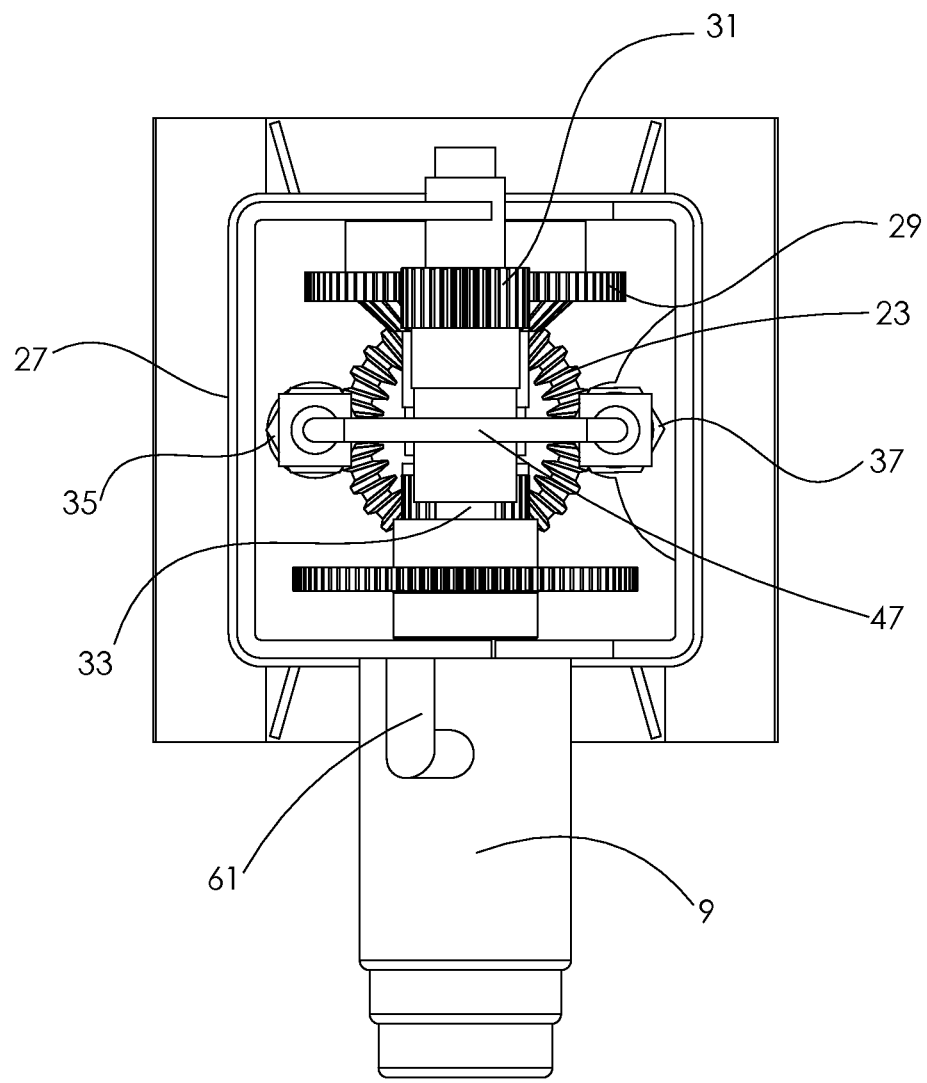
FIG. 5 is a sectioned top plan view of the upper leg housing for landing gear shown in FIG. 4, sectioned to show the powered gear train and positioning of cross-port disabling valves within an attached valve block.

The extension and retraction of the lower leg assembly 15 relative to the upper leg assembly 13 is typically controlled by an acme lead screw 19 connected therebetween. As shown best in FIG. 4, the acme screw 19 threads through an acme screw nut 21 affixed to the top of the lower leg assembly 15. The upper end of the acme screw 19 carries an acme bevel gear 23 which is drivingly engaged by the gear train 25 contained within the upper end leg housing 27. More specifically, as shown in FIG. 4, the gear train 25 includes a lower shaft spur/bevel gear 29 which engages and drives the acme bevel gear 23 carried by the acme screw 19. In turn, gear 29 is driven by the upper shaft spur gear 31 which is coupled to the drive shaft 33 of motor 9. Consequently, as motor 9 rotates in either direction, the gear train 25 turns the acme screw 19, thus causing the acme nut 21, which is fixed to the upper end of the lower leg assembly 15, to move back and forth along the acme screw 19. This, in turn, causes the lower leg assembly 15 to slidingly extend and retract relative to the upper leg assembly 13.

With reference now being made to FIGS. 4-6B, in accordance with the present invention, the preferred embodiment relies on a mechanical connection between the upper and lower leg assemblies 13 and 15 to mechanically sense when each travel stop limit (i.e., position adjacent to but short of full extension or full retraction of lower leg assembly 15) is reached. A pair of mechanical disable valves 35 and 37 is mounted in the upper leg assembly 13 such that one or the other is mechanically engaged (operated) by the lower leg assembly 15 when a travel stop limit is reached. The disable valves 35 and 37 operate independently with each dedicated to disable the drive system when one of the respective travel stop limits is reached. Valves 35 and 37 disable the hydraulic drive system by cross-porting the hydraulic drive system (i.e. connecting the pressure side to the return side) so full system flow bypasses the hydraulic motor and is returned directly to the return line. This cross-port condition disables the drive motor 9 in the respective non-preferred rotation.

Only one valve (35 or 37) is actuated depending on lower leg assembly 15 reaching the travel stop limit for a fully extended or fully retracted condition. At all other times, both valves 35 and 37 are in the non-cross port mode between the travel stop limit positions. In this manner, only the non-preferred rotation direction of motor 9 is disabled, depending on the relative position between the upper and lower leg assemblies 13 and 15. That is, at the fully extended travel stop limit position, the motor 9 is allowed to turn in the retract rotation mode and is disabled only in the extend rotation mode. Likewise, at the fully retracted travel stop limit position, the motor 9 is disabled (i.e., cross-ported) in the retract rotation mode and is allowed to rotate (i.e., not cross-ported) in the extend rotation mode. At all leg positions between the travel stop limits, the hydraulic circuit is not cross-ported and normal function in both directions is allowed.

To accomplish the above, each disable valve 35 and 37, which is preferably located within the housing 27 of the upper leg assembly 13, is operated by a mechanical connection to the lower leg assembly 15. As shown in FIGS. 4-6B, valve 35 is constructed for disabling motor 9 at the retracted travel stop limit position (i.e., leg assembly 15 is retracted to its travel stop limit position within upper leg assembly 13). Valve 35 is a mechanically operated "push-type" cartridge valve constructed to meet the flow and pressure requirements of a given application, and may be of a type similar to model MPO8 22, manufactured by Hydraforce, Inc.

Figure 6A:
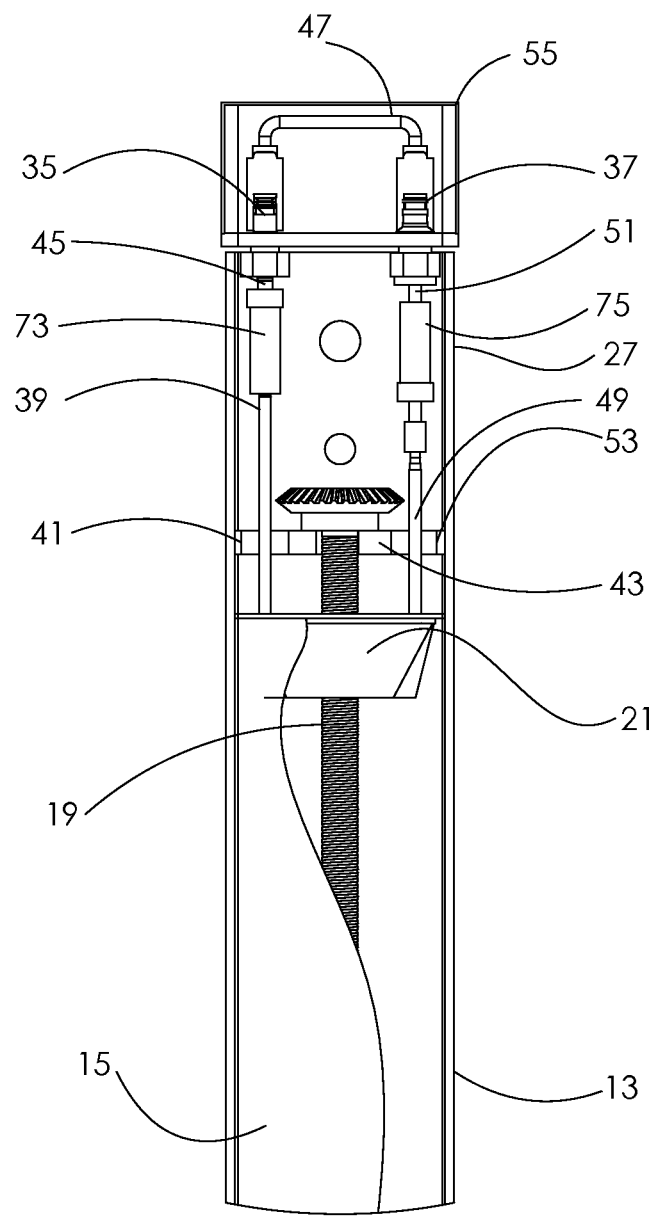
FIG. 6A is a sectioned side elavational view of the upper and lower leg assemblies for landing gear shown in FIG. 4, rotated 90 degrees with portions of the gear train removed to show the operation of the solid actuation shaft for the cross-port disabling valve when the leg assembly is in a retracted position.

As shown best in FIG. 6A, valve 35 is operated by a straight solid shaft-pin 39 mounted to the top of the lower leg acme screw nut 21. An opening 41 formed in the upper leg screw bearing plate 43 allows the shaft-pin 39 to enter the housing 27 of the upper leg assembly 13 where valve 35 is located. The free end of shaft 39 carries a force limiting spring member 73, the construction and function of which will be described in more detail hereafter. The length of the shaft-pin 39 is predetermined such that when the lower leg assembly 15 retracts to the travel stop limit position, spring member 73 will mechanically engage the disable trigger 45 of valve 35 and actuate the same. That is, upon retraction of leg assembly 15 to the travel stop limit, shaft-pin 39 pushes spring member 73 into trigger 45 to actuate disable valve 35, which then cross-ports the system's fluid flow through cross-port conduit 47 from the pressure side to the return side of the hydraulic circuit.

Spring member 73 functions primarily to protect the disable valve 35 and actuating linkage 39 from damage due to the continued over-travel of leg assembly 15 after disable valve 35 is actuated. The cross-port disabling circuit will inherently have some flow restriction through valves 35 and 37, such that built up back pressure in the system can possibly cause a small amount of fluid flow to continue to pass through drive motor 9. This back pressure can cause motor 9 to continue to drive the acme screw 19, albeit at a greatly reduced pressure than when the disable valves 35 and 37 are closed. However, at even 250 psi, the hydraulic motor 9 can generate significant torque which is further multiplied by the landing gear reduction and converted to even higher linear forces via the acme drive screw 19. If not accounted for, these forces are significant enough to cause damage to the push valve 35 via the force of leg assembly 15 through solid shaft 39.

To account for such forces generated by over-travel of leg assembly 15, spring member 73 is built into the actuating linkage or shaft 39 such that the force exerted against valve 35 through the actuating linkage is limited to the resistive force of the spring member 73, until the acme screw nut 21 comes to rest against its mechanical stop at its fully retracted position. Spring member 73 is designed such that, upon actuation of disable valve 35, approximately five millimeters (5.0 mm) or more of transitional travel is allowed under its limited spring force before the acme screw nut 21 comes to rest at its fully retracted position. Once leg assembly 15 reaches it fully retracted position, full torque from the motor 9 at the bypass circuit pressure level is transferred to the mechanical stop.

Once trigger 45 of valve 35 is pushed inward by shaft-pin 39 and spring member 73, fluid begins cross-porting through valve 35, and at approximately two millimeter (2.0 mm) depression, the majority of fluid flow is cross-ported through conduit 47, with only a limited amount of fluid going to motor 9. The fluid flow and pressure to the motor 9 at this point is determined by the pressure drop (flow restriction) through the bypass flow path. The reduced pressure through the bypass path reduces the motor torque to be well within design limits of the mechanical stop capability, and the spring 73 carried by the actuation shaft 39 allows shaft 39 to continue to travel without damage until the acme screw nut 21 comes to rest at its mechanical stop. Consequently, the hydraulic motor 9 is bypassed and thereby disabled from rotating further once the mechanical stop of acme screw nut 21 is reached. Notably, the mechanical disable valve 35 reliably cross-ports the circuit similar to a relief valve, but does so at a given pressure level defined by the pressure drop through the cross-port path and does so without responding to any system pressure increase or spike encountered at suddenly reaching a mechanical stop. Therefore, the mechanical disable valve solution avoids the problem of varying conditions and pressure spikes inherent in a relief valve solution.

Figure 6B:
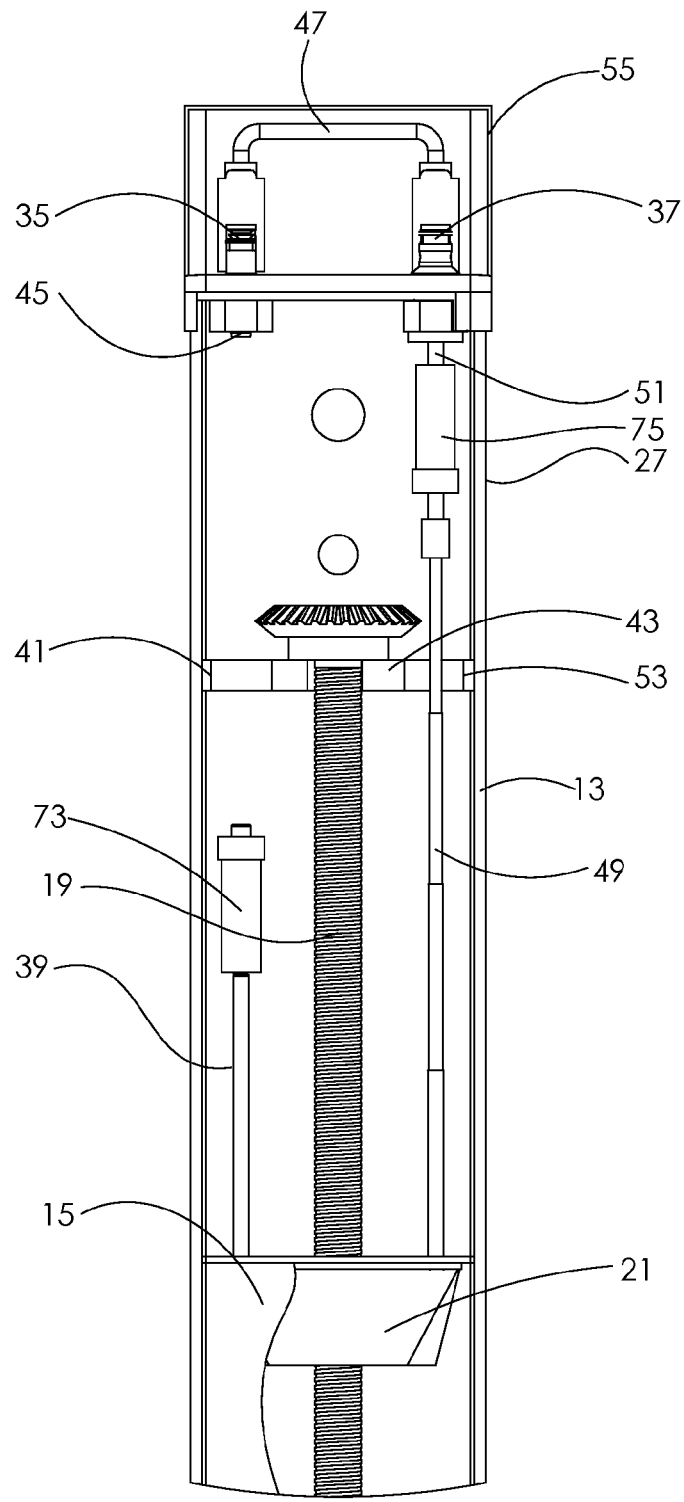
FIG. 6B is a sectioned side elavational view of the upper and lower leg assemblies for landing gear shown in FIG. 4, rotated 90 degrees with portions of the gear train removed to show the operation of the telescoping actuation shaft and cross-port disabling valve when the leg assembly is in an extended position.

As shown best in FIG. 6B, in the extended travel limit position (i.e., leg assembly 15 extended to travel stop limit position within upper leg assembly 13), the motor disable function operates similarly by utilizing a mechanical "pull-type" cartridge valve 37, similar to model MP08-20 manufactured by Hydraforce, Inc. However, instead of a solid shaft-pin, a telescoping shaft 49 is utilized with one end connected to the lower leg acme screw nut 21 in the lower leg assembly 15, and the other end connected through force limiting spring member 75 to the mechanical pull-type trigger mechanism 51 of disable valve 37. Here again, a second opening 53 formed in the upper leg screw bearing plate 43 allows the telescoping shaft 49 to enter the housing 27 of the upper leg assembly 13 where valve 37 is located. The extendible length of the telescoping shaft 49 is also predetermined such that, upon lower leg assembly 15 being extended to its respective travel stop limit position, it will pull the disable trigger 51 of valve 37 and actuate the same. That is, upon extension of leg assembly 15 to the extended travel stop limit, telescoping shaft 49 pulls (actuates) the trigger 51 of disable valve 37, which in turn cross-ports the system's fluid flow through cross-port conduit 47 from the pressure side to the return side of the hydraulic circuit. Consequently, the hydraulic motor 9 is bypassed and thereby disabled from rotating any further in the extending direction, although the circuit continues to allow operation of the motor 9 in the reverse direction.

Similar to spring member 73 associated with disable valve 35, spring member 75 functions primarily to protect the disable valve 37 and actuating linkage/telescoping shaft 49 from damage due to the over-travel of leg assembly 15 after disable valve 37 is actuated. Spring member 75 is built into the actuating linkage or telescoping shaft 49 such that the force pulling on valve 37 through the actuating linkage is limited to the force of the spring member 75, until the acme screw nut 21 comes to rest against its mechanical stop at its fully extended position. Similar to spring 73, spring member 75 is designed such that, upon actuation of disable valve 37, approximately five millimeters (5.0 mm) or more of transitional travel is allowed under its limited spring force before the acme screw nut 21 comes to rest at its fully extended position. Once leg assembly 15 reaches it fully extended position, full torque from the motor 9 at the bypass circuit pressure level is transferred to the mechanical stop.

Therefore, similar to retract disable valve 35, the mechanical actuation of disable valve 37 using the telescoping shaft 49 reliably cross-ports the circuit in a manner similar to a pressure relief valve, but does so at a given pressure level defined by the pressure drop through the cross-port path and does so without responding to any system pressure increase or spike encountered at suddenly reaching a mechanical stop. Therefore, the mechanical disable valve solution avoids the problem of varying conditions and pressure spikes inherent in a relief valve solution. This avoids the pitfalls and problems of relief valve or other electric position sensing solutions. When either disable valve 35 or 37 is actuated, only the non-preferred rotation of motor 9 is disabled, and motor rotation in the opposite direction is allowed to either initiate leg extension when fully retracted or initiate retraction when fully extended. It should also be noted that the telescoping shaft connection allows the designer to set the maximum full extend distance so the problems and safety hazards associated with over-extended legs is controlled reliably.

It is worth noting that upon either cross-port disable valve 35 or 37 being actuated, the pressure in the motor drive circuit is greatly reduced as flow is bypassed through the disable circuit. During the roughly 5 mm transitional travel distance, the maximum pressure through motor 9 is limited by the pressure drop through the disable circuit. At typical power unit flows, this pressure is limited to approximately 250 to 300 psi. Thus, the torque generated is greatly reduced and the maximum linear force generated through the acme screw 19 is well within the mechanical stop limit capability. However, the liner force generated by 250 psi will exceed 1000 lbs., which is considerably greater than the actuation linkage or disabling valves 35 and 37 can survive without failure. The actuation linkage must therefore allow over-travel of leg assembly 15 until the 1000 lb. force comes to rest against a mechanical stop (i.e., either at its fully retracted or fully extended position).

By way of example only and without limiting the scope of the present disclosure, it is contemplated that spring member 73 associated with disable valve 35 may be composed of a coil spring, leaf spring or an elastomer of some form capable of dampening the liner over-travel force generated by leg assembly 15. Spring 37, on the other hand, may be composed of a box-type spring mechanism, or equivalent, that is capable of providing the necessary transitional travel of leg assembly 15 at a greatly reduced tensional force. As still another alternative, it is further contemplated that springs 73 and 75 could be replaced with a cam design mechanism that is capable of actuating valves 35 and 37, and allowing sufficient transitional travel of leg assembly 15 until the acme screw nut 21 reaches its final mechanical stop.

In this way, the mechanically actuated disable valve solution ensures reliable, repeated performance at known, preset travel stop limit points to ensure reliable and safe operation of powered landing gear. In fact, with the mechanically operated disable valve solution employed, powered landing gear technology is more reliable and safer to operate than traditional manual-crank systems. Safety and reliability are increased not only by protecting the operator from worker injury by eliminating manual crank operation, but also by protecting the landing gear from catastrophic failure modes encountered when driving the gear past the intended travel stop limit positions.

From a safety standpoint, it is important that the actuating shafts 39 and 49 for the disable valves 35 and 37, and associated linkage, have adequate strength to avoid failure due to stresses caused during actuation thereof. For the "push" actuation retract mode, the solid shaft pin 39 is selected with a safety factor for loading that goes far beyond any reasonable risk of failure. In addition, to ensure the loading force does not exceed design limits, spring 73 is added to limit the maximum loading force until the mechanical stop for acme nut 21 is reached. The maximum linear force that can be generated is thereby limited unit the mechanical stop is reached. The bypass circuit greatly reduces the maximum hydraulic pressure that can be reached, and this pressure is reached when the mechanical stop is reached by the acme screw nut 21. During the transition from disable valve actuation until the mechanical stop is reached, the pressure and force in the linkage is limited to the force of spring 73 or alternate cam design in the linkage. Similarly, the box spring 75 that is incorporated into the telescopic actuating shaft linkage 49 also limits the maximum force generated until the mechanical stop of leg assembly 15 is reached. In both the fully retracted and extended modes, the final stopping point is the mechanical stops of the acme screw nut 21, and that force at this point is limited to the torque that can be generated at the bypass cross-port pressure.

It has been found that a typical "pull" type valve 37 generally operates upon 4 to 15 lbs. trigger force, but certain companies, such as Delta Power Co. and Hydraforce, Inc., are capable of making custom valves with reduced actuating spring force requirements. Therefore, it is contemplated that the "pull" type disable valve 37 may only require between 5 to 10 lbs. pull force to actuate, and it is important that the tensile strength of the telescoping shaft 49 at full extension or retraction must exceed at least this amount of force without breakage. With this in mind, a 50 lb. telescoping shaft design has been tested using several of the same units with little variability from unit to unit. With the loading and pull strength of the telescoping shaft exceeding 50 lbs., there should be a safety factor of at least 5, which is deemed acceptable from a safety standpoint.

Figure 7:
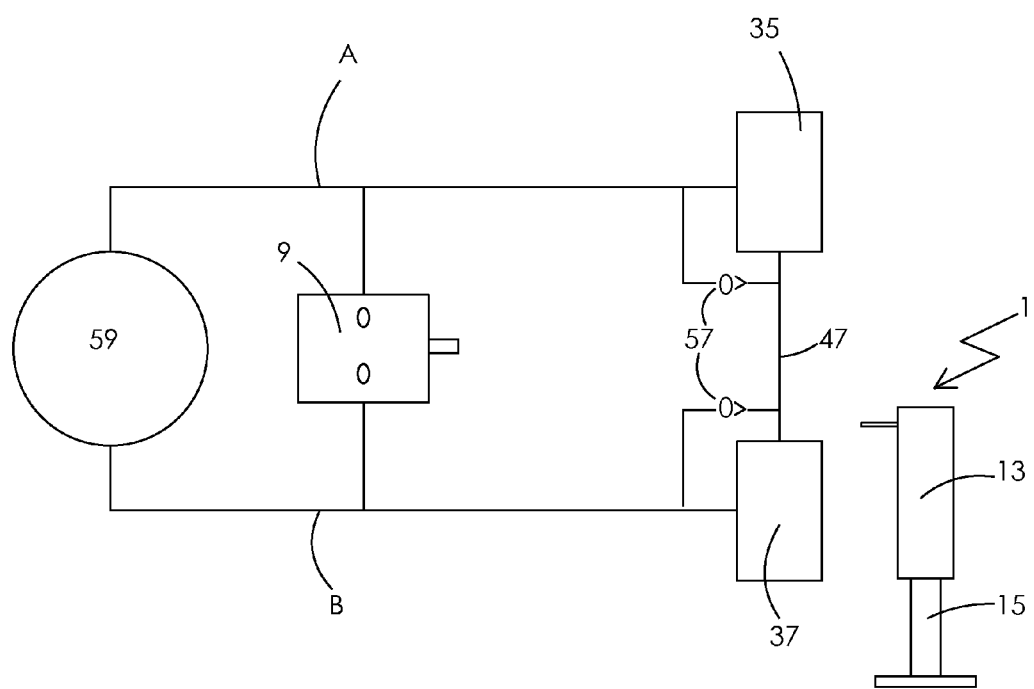
FIG. 7 is a diagrammatic view of an exemplary cross-porting bypass circuit incorporating the disable valves of the present invention.

With reference now to FIG. 7, an exemplary circuit is shown which depicts one manner in which the cross-port disabling vales 35 and 37 may be fluidly coupled to the motor 9 of the hydraulic drive circuit. As shown, in normal operation lines A and B from the hydraulic power source 59 are connected to the motor 9 and both disable valves 35 and 37 are closed. Thus, fluid flow is forced through the motor 9 and the motor will turn to extend or retract depending on the control valve flow from the power unit 59. When line A is pressurized, the motor 9 causes the landing gear to RETRACT. When line B is pressurized, the motor 9 causes the landing gear to EXTEND.

Valve 35 symbolized in FIG. 7 is a "push" type valve with trigger mechanism 45 that is actuated by the solid shaft pin 39 (push actuation) connected to the acme screw nut 21. When actuated, valve 35 cross-ports the fluid flow through conduit 47 to the low pressure return line, thus bypassing and disabling the motor 9 and preventing further retraction of the landing gear. Valve 37 symbolized in FIG. 7 is a "pull" type valve with trigger mechanism 51, and controls the extend function. When pulled, valve 37 similarly cross-ports the fluid flow through conduit 47 to the low pressure return line, thus bypassing and disabling the motor 9 from turning further and over-extending the landing gear. Notably, both circuits still allow rotation in the opposite (i.e., preferred) direction to prevent failure of the landing gear, yet stop rotation in the non-preferred direction.

The disable circuit includes check valves 57 that prevent fluid flow from turning motor 9 in the disabled direction, while allowing fluid flow in the opposite direction. The check valves 57 added to the circuit are compatible with both push and pull type disable valves 35 and 37, respectively, to cross-port fluid flow in the disabled direction, while maintaining operation in the opposite direction. It should be noted that there are a number of possible circuits which could be utilized to implement the desired function of the disable valves herein, and the above disclosure is intended to be exemplary only.

As shown best in FIG. 4, hydraulic fluid lines A and B from the motor 9 may be coupled to the disable valves 35 and 37 via a T-fitting 61. During normal operation, both valves 35 and 37 are closed so the hydraulic fluid flows through motor 9 in a direction determined by which fluid line, A or B, is pressurized. In this case, fluid does not flow through the T-fitting 61 to either valve 35 or 37. However, once the lower leg assembly 15 of the master leg 3 of landing gear 1 reaches a travel stop limit through retraction or extension, one of the respective disable valves 35 or 37 is actuated and opened, thus causing the fluid to flow through the T-fitting 61 to the open disable valve. The fluid is then cross-ported through the open disable valve and cross-port conduit 47 to the return line, thereby bypassing and disabling motor 9 in the manner described above.

As shown in the drawings, in the preferred embodiment, the disable valves 35 and 37 are housed internally in the upper leg housing 27, protected from the environment as well as from external damage. The actuating shafts 39 and 49 extending from the lower leg assembly 15 to the disable valves 35 and 37 are also housed internally to be protected from external damage or corrosion from the external environment. With this embodiment, the disable valve 35 and 37 can be employed using either external gear box designs (offered by the Holland Binkley SAF company) or internal gear designs (offered by Jost International company). The mechanical disable valves 35 and 37 can each also be housed in separate manifold valve blocks (one for each disable valve) or both disable valves can be housed in a single manifold valve block 55, similar to that depicted in the exploded view of FIG. 3. This lends flexibility to adapting the disable valve scheme for a variety of landing gear systems.

Figure 8:
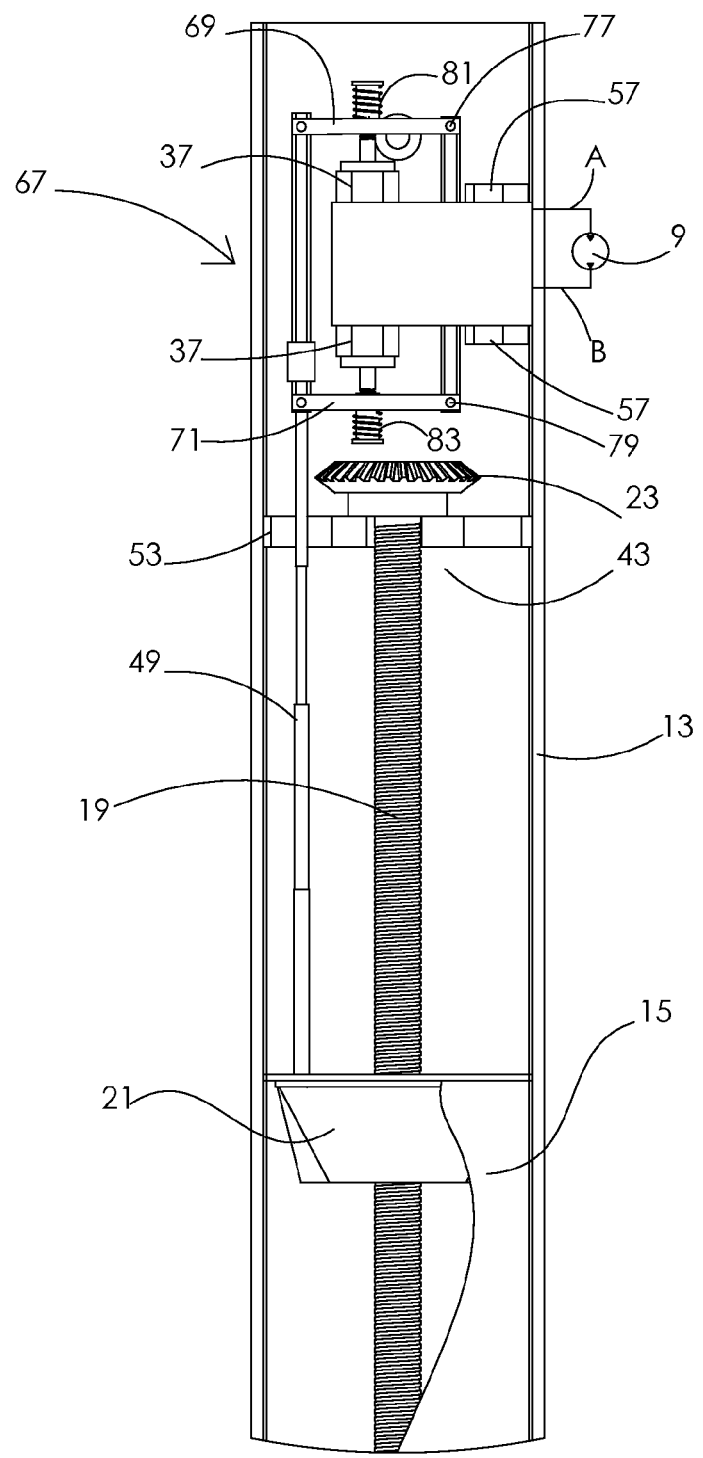
FIG. 8 is a sectioned side elavational view of an alternative embodiment of the upper and lower leg assemblies for landing gear with portions of the gear train removed to show an alternate arrangement of a cross-port bypass circuit utilizing a single telescoping shaft to operate two mechanical "pull" type disable valves.

In another embodiment of the invention, as shown in FIG. 8, a single telescoping shaft, similar to shaft 49, can be connected to a linkage 67 having levers 69 and 71 that operate a pair of "pull" type disable valves 37. Levers 69 and 71 are constructed to pivot about fixed fulcrum points 77 and 79. As such, when telescopic shaft 49 reaches its fully extended position (i.e., the extended travel stop limit), lever 71 pulls the lower valve 37 open to disable rotation of motor 9 in the leg extending direction. Conversely, at the fully retracted travel stop limit position, the telescopic shaft 49 is fully retracted and pushes upward on lever 69 to actuate the upper mechanical pull type valve 37. Here again, similar to prior embodiments, force limiting springs 81 and 83 are carried by the respective valve stems of the upper and lower disabling valves 37 to limit the linear forces generated through over-travel of leg assembly 15. A variety of linkage schemes may be incorporated to utilize mechanical pull or mechanical push valves. By way of example only and not intending to limit the scope of the invention herein, the following methods are possible utilizing the present invention:

1. Dual shaft design (as disclosed herein) using one solid shaft-pin 39 operating one mechanical push valve 35 and one telescoping shaft 49 operating one mechanical pull valve 37;
2. Single (1) telescoping shaft 49 operating two (2) mechanical pull valves 37 via linkage 67 and levers 69 and 71 (See, FIG. 8);
3. Single (1) telescoping shaft operating one mechanical push valve 35 and one mechanical pull valve 37;
4. Derivatives of the above using levers to reverse pull or push direction in combination with mechanical pull or mechanical push valves 35 and 37; and
5. Another embodiment is possible utilizing a single 3 position mechanical push/mechanical pull valve.

In addition to the above, the mechanically actuated disable valve system of the present invention can also be deployed as an externally mounted solution for retro-fitting existing landing gear. In this embodiment, the disable valves 35 and 37 and actuation shafts 39 and 49 can be mounted in a housing/tube arrangement mounted to the side of an existing landing gear. The difference in this embodiment from the internal design described above is the lower actuation shafts 39 and 49 are connected to the outside of the lower leg assembly 15 and operated by a single telescoping shaft connected to a shaft linkage that operates the disable valves mounted in an housing that is in turn mounted externally to an existing landing gear for retro-fit applications.

In still other possible embodiments, it is possible to utilize wire, cable and/or a coiled metal strip instead of the telescoping shaft(s) and solid shaft pin(s) to actuate the disable valves. In still other embodiments, rope and/or pulley(s)/spool(s) could be used to actuate the disable valves, thus performing the same mechanical function as the telescoping shaft(s) and solid shaft pin(s). Further embodiments of the invention are also possible with the disable valves triggered by connection to the input crank or output cross shaft 7 that connects the master and slave legs, 3 and 5. The cross shaft 7 maintains a constant relative position to the landing gear upper and lower leg positions. The turns per inch of travel remains constant and a number of means can be deployed to connect the disable valves 35 and 37 to this shaft, including gears, an additional acme drive screw, wires and/or cable.

It is also possible to utilize the present invention whereby only one of the disable valves 35 or 37 is utilized and another means to solve the travel limit problem is employed. By way of example, one could use only one disable valve (such as valve 35) to disable the motor 9 at the fully retracted travel stop limit position, and rely on the operator viewing a warning label that appears on the lower leg assembly 15 when it reaches the fully extended travel stop limit position. Such visible sight warning markings on the lower leg assembly 15 are already being used in manual crank systems to warn of over-extending the legs.

It is important to point out that the landing gear legs may also be used in place of cylinder outriggers or stabilizer systems for trailers, recreational vehicles, truck mounted cranes and utility work truck stablizier/outrigger applications. In those applications, the landing gear legs may be operated independently and remotely and not in a master/slave type on-highway semi-trailer application. For those applications, it is most likely preferred to employ a two valve system as the operator may not be in a position to see such a visible warning marking.

It is also important to note that unless a viable solution can be achieved to resolve the aforementioned problems associated with limiting the end of travel of powered landing gear legs, the use of hydraulically powered landing gear systems likely cannot be implemented successfully. No one is willing to accept a powered drive solution that results in failure of the jacking screw leg at its travel stop limit positions. Although operators can be trained, it is most desired and likely required in powered landing gear systems to have automatic stop limits incorporated into the powered leg.

As noted previously, with the mechanically operated disable valve solution employed, powered landing gear technology is more reliable and safer to operate than traditional manual-crank systems. However, it is still necessary to provide a manual over-ride solution in case hydraulic power is lost for some reason. In a traditional manual-crank system, a crank shaft (not shown) protrudes approximately 6 inches from opening 11 in bearing block 12, to which a manual crank is connected. In a powered landing gear system, the manual crank is disconnected, but there remains an issue as to the protruding and spinning crank shaft. Such an exposed manual crank shaft presents a safety concern, as clothing, hair, or jewelry, etc., can become wrapped in the turning drive shaft and cause bodily injury. To resolve this safety concern, the use a safety protective cover over the crank shaft has previously been considered. However such a cover can be cumbersome to remove and adds additional material, weight and cost to the system.

In a more preferred embodiment, as shown best in FIGS. 1 and 4, the manual crank shaft that typically extends outward from opening 11 in bearing block 12 may be cut off and configured so as to be flush to the face of block 12. In this case, the terminal end (i.e., crank mount) of the crank shaft inside block 12 may be configured as a square socket, such that a standard ½ inch socket wrench (or ⅜ inch wrench with ½ inch adapter) can be inserted through opening 11 to engage the internal crank shaft and manually operate the landing gear assembly 1. Alternatively, the end of the internal crank shaft within bearing block 12 could be similarly configured with any other suitable shape for engagement, such as an internal hex within which an allen head drive socket may be inserted to operate the landing gear assembly 1. Regardless of the internal crank shaft end configuration, with this embodiment, the normal mechanically connected shaft is not exposed and no protective cover is needed for operator safety, i.e., so that clothing, hair, jewelry or other worn item(s) is not in danger of becoming entangled with the shaft. In this embodiment, the crank shaft can still be accessed without need to remove any protective cover, and operators/bystanders are still protected from injury.

Although not required, a cap or plug (not shown) that is capable of being inserted within opening 11 of bearing block 12 could be provided to cover the manual internal over-ride socket. The benefit is using such a protective cap or plug is to improve the sealing of the landing gear assembly 1 and prevent corrosion from occurring around the internal crank shaft. The internal socket for the crank shaft is already recessed to improve safety and prevent workers from injury, so there is no external rotating shaft turning for hair, clothing or jewelry to get entangled. Therefore, adding such a cap/plug to cover the socket opening 11 will act to improve sealing as well as enhance protection against safety concerns. This is a distinct improvement over conventional manual landing gear systems, which generally only incorporate a simple dust seal, or have no seal whatsoever to provide such protection. Notably, the internal socket for the crank shaft could also be formed in the upper drive shaft 65 for spur gear 31, depending on final configuration type and style of the landing gear.

It will, of course, be understood that various changes may be made in the form, details, arrangement and proportions of the parts without departing from the scope of the invention which comprises the matter shown and described herein.

The invention claimed is:

1. A travel limiting apparatus for fluid-powered landing gear, comprising:
   (a) a first leg assembly;
   (b) a second leg assembly received within said first leg assembly and telescopically movable therein between a fully retracted position and a fully extended position;
   (c) a fluid powered motor operably connected to said first and said second leg assembly for causing movement of said second leg assembly relative to said first leg assembly;

(d) a mechanically actuated motor disabling member connected to said motor for diverting fluid flow away from said motor when actuated;

(e) an actuating member carried by said second leg assembly, said actuating member being constructed to apply a mechanical actuating force to said motor disabling member upon said second leg assembly reaching a predetermined travel stop limit position adjacent to but short of one or both of said fully retracted and said fully extended positions.

2. The travel limiting apparatus set forth in claim 1, wherein said actuating member is comprised of an elongated solid shaft.

3. The travel limiting apparatus set forth in claim 1, wherein said actuating member is comprised of an extensible telescoping shaft.

4. The travel limiting apparatus set forth in claim 1, wherein said actuating member is an extensible member having opposite ends, one of said ends being connected to said second leg assembly and the other of said ends being connected to said motor disabling member.

5. The travel limiting apparatus set forth in claim 1, wherein said actuating member carries a force limiting member which limits the amount of said actuating force applied to said motor disabling member during continued travel of said second leg assembly beyond said predetermined travel stop limit position.

6. The travel limiting apparatus set forth in claim 5, wherein said force limiting member is comprised of a spring member disposed between said actuating member and said motor disabling member.

7. The travel limiting apparatus set forth in claim 1, wherein said motor disabling member includes a first disable valve and a second disable valve, said first disable valve being constructed to divert fluid flow away from said motor upon actuation when said second leg assembly reaches said predetermined travel stop limit position adjacent said fully retracted position, and said second disable valve being constructed to divert fluid flow away from said motor upon actuation when said second leg assembly reaches said predetermined travel stop limit position adjacent said fully extended position.

8. The travel limiting apparatus set forth in claim 7, wherein said actuating member includes a solid shaft for actuating said first disable valve and an extensible telescoping shaft for actuating said second disable valve.

9. The travel limiting apparatus set forth in claim 8, wherein said solid shaft and said telescoping shaft each have opposite ends, one of said ends of said solid shaft being connected to said second leg assembly and the other of said ends of said solid shaft being free, and one of said ends of said telescoping shaft being connected to said second leg assembly and the other of said ends of said telescoping shaft being connected to said second disable valve.

10. The travel limiting apparatus set forth in claim 8, wherein said solid shaft carries a force limiting member which limits the amount of said actuating force applied to first disabling valve and said telescoping shaft carries a force limiting member which limits the amount of said actuating force applied to said second disabling valve.

11. The travel limiting apparatus set forth in claim 7, wherein said actuating member is comprised of a single extensible telescoping shaft having one end connected to said second leg assembly and an opposite end portion connected to both said first disable valve and said second disable valve.

12. The travel limiting apparatus set forth in claim 1, including a manual over-ride for said fluid powered motor, said manual over-ride comprising a manual crank shaft operably connected to a leg assembly gear train for causing movement of said second leg assembly relative to said first leg assembly, said crank shaft having an terminal crank end mount that is accessible from the exterior but disposed internally within a housing for said gear train.

13. A travel limiting apparatus for fluid-powered landing gear, comprising:

(a) a first leg assembly;

(b) a second leg assembly received within said first leg assembly and telescopically movable therein between a fully retracted position and a fully extended position;

(c) a fluid powered motor operably connected to a leg assembly gear train for causing movement of said second leg assembly relative to said first leg assembly;

(d) a mechanically actuated motor disabling member comprising a first disable valve fluidly connected to said motor for diverting fluid flow away from said motor when actuated during retraction of said second leg assembly, and a second disable valve fluidly connected to said motor for diverting fluid flow away from said motor when actuated during extension of said second leg assembly; and (e) a force regulated actuating member connected to said second leg assembly, said actuating member being constructed to apply a controlled mechanical actuating force to said first and said second disable valves, respectively, upon said second leg assembly reaching a predetermined travel stop limit position approaching but short of said fully retracted and said fully extended positions.

14. The travel limiting apparatus set forth in claim 13, wherein said actuating member includes a solid shaft for actuating said first disable valve and an extensible telescoping shaft for actuating said second disable valve.

15. The travel limiting apparatus set forth in claim 14, wherein said solid shaft and said telescoping shaft each have opposite ends, one of said ends of said solid shaft being connected to said second leg assembly and the other of said ends of said solid shaft being free, and one of said ends of said telescoping shaft being connected to said second leg assembly and the other of said ends of said telescoping shaft being connected to said second disable valve.

16. The travel limiting apparatus set forth in claim 13, wherein said actuating member includes a force limiting member comprised of a spring regulating means for controlling the mechanical actuating force applied to said first and said second disable valves.

17. The travel limiting apparatus set forth in claim 16, wherein said spring regulating means is constructed to control the amount of force applied to said disable valves during continued travel of said second leg assembly beyond said predetermined travel stop limit position.

18. The travel limiting apparatus set forth in claim 13, wherein said actuating member is comprised of an extensible telescoping shaft having opposite ends, one end of which is connected to said second leg assembly and the other said end of which is connected to both of said first and said second disable valves.

19. The travel limiting apparatus set forth in claim 13, including a manual over-ride for said fluid powered motor, said manual over-ride comprising a manual crank shaft operably connected to said leg assembly gear train for causing movement of said second leg assembly relative to said first leg assembly, said crank shaft having an terminal crank end mount that is accessible from the exterior but disposed internally within a housing for said gear train.

20. The travel limiting apparatus set forth in claim 13, wherein said mechanically actuated motor disabling member and said force regulated actuating member are enclosed within a housing associated with said first leg assembly and said leg assembly said gear train.

* * * * *